J. WEATHERS.
Automatic-Gates.
No. 155,130.
Patented Sept. 15, 1874.
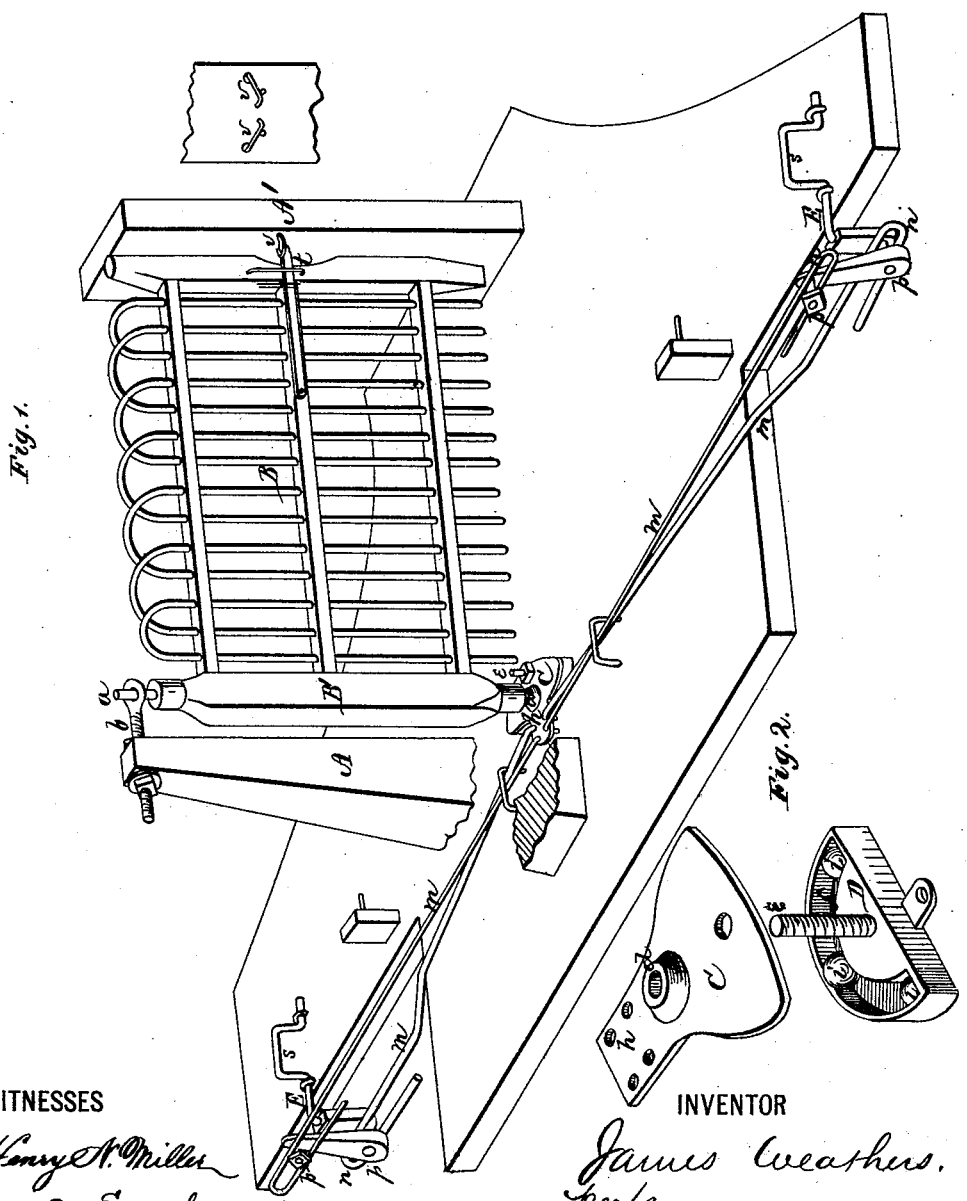
WITNESSES
INVENTOR

UNITED STATES PATENT OFFICE.

JAMES WEATHERS, OF GREENSBURG, INDIANA.

IMPROVEMENT IN AUTOMATIC GATES.

Specification forming part of Letters Patent No. 155,130, dated September 15, 1874; application filed August 4, 1874.

*To all whom it may concern:*

Be it known that I, JAMES WEATHERS, of the town of Greensburg, in the county of Decatur and in the State of Indiana, have invented certain new and useful Improvements in Self-Acting Gates; and do hereby declare that the following is a full, clear, and exact description thereof, reference being had to the accompanying drawings and to the letters of reference marked thereon, making a part of this specification.

My invention relates to an improvement in automatic gates; and consists in the construction and operation of parts hereinafter more fully set forth and claimed.

In order to enable others skilled in the art to which my invention appertains to make and use the same, I will now proceed to describe its construction and operation, referring to the annexed drawing, in which—

Figure 1 is a perspective view of the entire gate, and Fig. 2 is a detached view of a part thereof.

A represents the inner, and A' the outer, gate-post. B is the gate, constructed in any suitable manner, the post B' at its inner end being provided with a journal, $a$, at each end. The upper journal is inserted in an eye-screw, $b$, which is passed through the upper end of the gate-post A, while the lower journal is inserted in a box or step, $d$, on a plate, C. This plate is pivoted by a screw, E, to a box, D, fastened to the ground. In this box D is a semicircular groove or recess, $f$, containing rollers $i$ $i$, upon which the plate C rests and moves, thereby reducing the friction. From the plate C projects an arm, $h$, and from this arm extend toward both sides two rods, $m$ $m$, the outer ends of which form loops $n$ $n$, as shown in Fig. 1. The two loops on each side are placed on two cranks, $p$ $p$, extending in opposite directions from a shaft, E, which is placed in suitable bearings $x$ $x$, across one side of the road. The shaft E is also provided or formed with another crank, $s$, which stands in an upright position, as shown. A vehicle approaching the gate, when closed, will drive over the crank $s$, and turn the same downward toward the gate. The lower crank $p$ will, thereby, through the medium of its rod $m$, pull the plate so as to turn it on its pivot $e$, and through the lower pivot or journal of the gate out of line. This will cause the gate to open away from the approaching vehicle. When the vehicle has passed through the gate it is driven over the other crank, $s$, turning the same down away from the gate, whereby the upper crank $p$ of that shaft E, will, by its rod, return the plate C to its original position, causing the gate to close. The gate B is provided with a pivoted latch-bar, $t$, and on the inner side of the post A' are two pivoted latches, $v$ $v$, for holding the gate closed. The bar $t$ will clear said latches, as soon as the gate is thrown out of line, as above described.

Having thus fully described my invention, what I claim as new, and desire to secure by Letters Patent, is—

In combination, with the gate B and B', hinged at its top to the post A of the box D, having groove $f$, and rollers $i$, the cap plate C, with step $d$, forming a bearing and socket for the lower end of the gate-post, all operating substantially as set forth.

In testimony that I claim the foregoing I have hereunto set my hand this 16th day of July, 1874.

JAMES WEATHERS.

Witnesses:
 PUTNAM EWING,
 GEORGE M. EWING.